United States Patent [19]

Jeskey

[11] Patent Number: 4,647,152

[45] Date of Patent: Mar. 3, 1987

[54] OPTICAL APPARATUS

[75] Inventor: Richard V. Jeskey, Fiskdale, Mass.

[73] Assignee: Incom, Inc., Southbridge, Mass.

[21] Appl. No.: 442,512

[22] Filed: Nov. 18, 1982

Related U.S. Application Data

[63] Continuation of Ser. No. 427,789, Sep. 29, 1982, abandoned.

[51] Int. Cl.$^4$ ............................................. G02B 6/04
[52] U.S. Cl. ............................ 350/96.24; 350/96.25
[58] Field of Search ................ 350/96.24, 96.25, 96.26

[56] References Cited

U.S. PATENT DOCUMENTS

| | | | |
|---|---|---|---|
| 2,825,260 | 11/1954 | O'Brien | 88/1 |
| 2,983,835 | 5/1961 | Frey, Jr. | 313/89 |
| 3,469,026 | 9/1969 | Winik et al. | 178/6.8 |
| 3,767,910 | 10/1973 | Harrigan | 350/96.24 |
| 4,085,420 | 4/1978 | Stukenbrock | 358/56 |
| 4,116,739 | 9/1978 | Glenn | |
| 4,123,137 | 10/1978 | Marcatili | 350/96.21 |
| 4,272,156 | 6/1981 | Ishibashi et al. | 350/96.24 |
| 4,279,465 | 7/1981 | Vojvodich | 350/96.20 |
| 4,381,882 | 5/1983 | Sabine | 350/96.20 |

FOREIGN PATENT DOCUMENTS 2028561  3/1980  United Kingdom ............. 350/96.24

OTHER PUBLICATIONS

Glenn, "A Fiber-Optic Magnifying Display Panel", SID 83 Digest (1983) pp. 46–47.

*Primary Examiner*—William L. Sikes
*Assistant Examiner*—Robert E. Wise
*Attorney, Agent, or Firm*—Norman S. Blodgett; Gerry A. Blodgett

[57] ABSTRACT

Apparatus for expanding a visual image consisting of a ribbon of optical fibers locked in closely-spaced, parallel relationship and cut across at a narrow acute angle at one end, the surface thus exposed being roughened in texture and the exterior of each fiber being provided in that area with a reflective material.

1 Claim, 7 Drawing Figures

U.S. Patent   Mar. 3, 1987   4,647,152
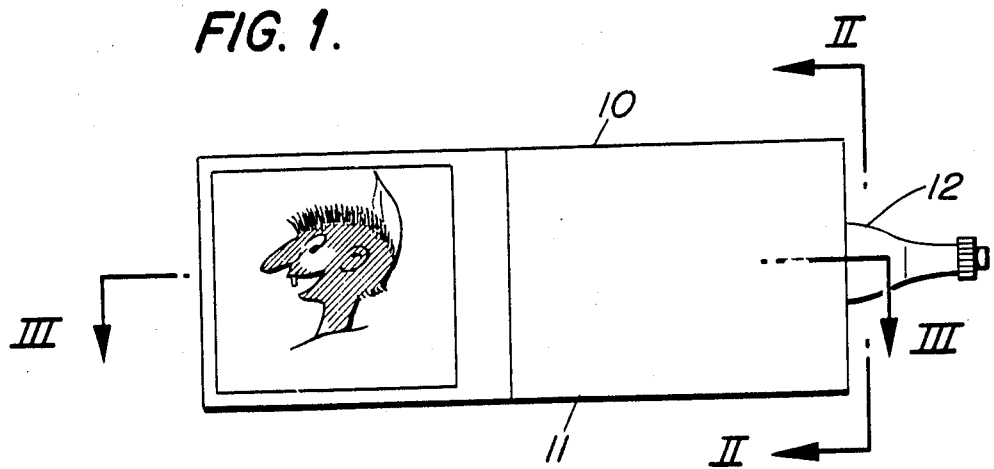
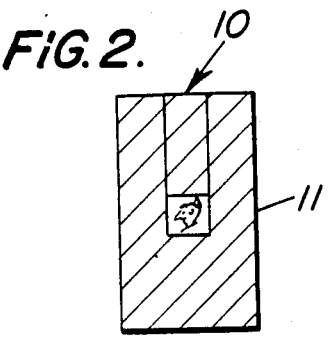
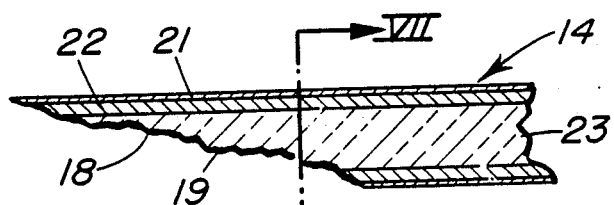
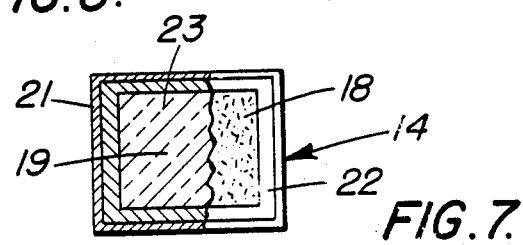
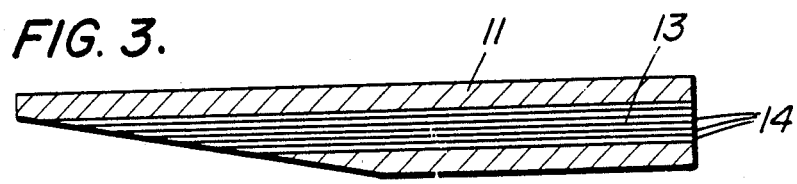
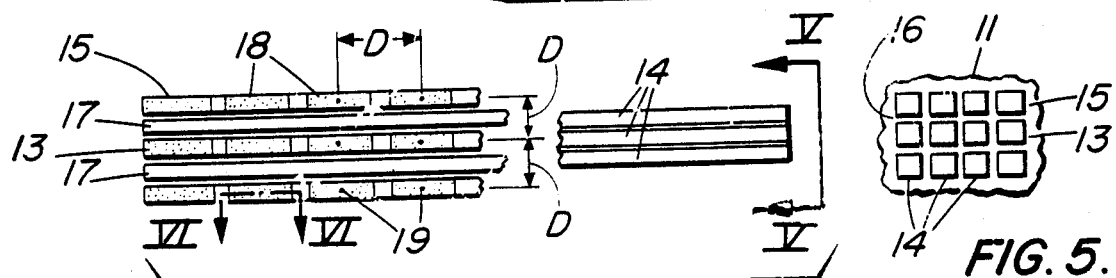
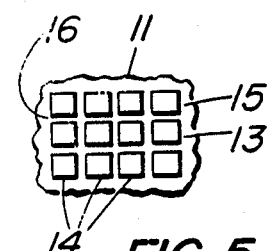

OPTICAL APPARATUS

CROSS REFERENCE TO RELATED APPLICATION

This application is a continuation of co-pending application Ser. No. 427,789, filed Sept. 29, 1982, now abandoned, by the same inventor.

BACKGROUND OF THE INVENTION

In the recent past the perfection of the optical fiber as a means of transmitting light has brought about many innovations in the decorative and technical arts. From the very beginnings of the optical fiber industry, it has been recognized that the bundle of optical fibers presents an excellent method of magnifying or expanding images. By maintaining the fibers at one end of the cable in a closely relationship to receive a small image and spreading the fibers at the other end to produce a large image, it is possible to magnify pictures of various kinds. Naturally, the light entering at the small end must be quite intense in order to obtain an image at the other end which is capable of being seen. However, the major problem is that, in order that the image appear exactly the same at the large end as it was when it was received at the small end, the fibers must be spread in exactly the same pattern as exists at the small end. Although this can be accomplished manually, it is a very difficult operation to perform in a production setting. For instance, it has always been a desirable technical feat to magnify a television image; at the present time, it is accomplished by the use of a projection lens. This means, however, that the input cathode-ray tube must produce a very intense image, because the amount of light that is generated is spread out over a large area and therefore, becomes weaker. The use of an intense television image generates a large amount of heat and this requires substantial cooling of the CRT and related equipment. In accomplishing the same function with optical fibers, the advantages are obvious. For one thing, the fibers can be arranged on a flat screen held against the wall. However, the problem is still one of arranging the output fibers in exactly the same pattern and arrangement as the input ends of the fibers; this has been a production feat that has been insolvable. These and other difficulties experienced with the prior art devices have been obviated in a novel manner by the present invention.

It is, therefore, an outstanding object of the invention to provide optical apparatus that contains a plurality of optical fibers in which the input fiber arrangement and the output fiber arrangement are exactly the same, but the output fibers are spaced further apart.

Another object of this invention is the provision of optical apparatus for enlarging or expanding a visual image without distortion.

A further object of the present invention is the provision of a method of arranging optical fibers so that the input pattern and the output pattern are very accurately the same.

It is another object of the instant invention to provide an optical image expander which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of optical apparatus including a housing in which are mounted a first row of optical fibers arranged in an evenly-spaced row and a second row of optical fibers similar to the first row. Means is provided for maintaining the first ends of both rows in close, fixed proximity, while means is provided for maintaining the other ends of the rows in spaced parallel relationship. The ends of the fibers at the said other end of the rows are cut at a narrow angle to their centers to form broad emission surfaces. A spacer is located between rows to cause the spacing of the centroids of the face surfaces of the fibers at the said other end to be the same between adjacent rows as they are between adjacent fibers in the same row.

More specifically, the invention involves optical apparatus consisting of an optical fiber of uniform cross section which is adapted to receive a light image at an input end and which has a cladding layer applied to the outer surface of the fiber. A reflective layer is provided over the cladding layer, while the exit end of the fiber is cut at a narrow angle to the centroid to expose an emission surface which is substantially greater than the cross section, the emission surface being roughened.

The invention also involves a method of forming optical apparatus consisting of the step of forming a row of optical fibers in which the centers of the fibers are evenly spaced and lie in a flat plane, the step of cutting the row at an acute angle, thereby exposing emission surfaces that are substantially greater than the cross section of the fibers, and then roughening the said surfaces.

BRIEF DESCRIPTION OF THE DRAWINGS

The character of the invention, however, may be best understood by reference to one of its structural forms, as illustrated by the accompanying drawings, in which:

FIG. 1 is a front elevational view of an optical apparatus embodying the principles of the present invention, FIG. 2 is a transverse sectional view of the apparatus taken on the line II—II of FIG. 1, FIG. 3 is a longitudinal sectional view of the apparatus taken on the line III—III of FIG. 1, FIG. 4 is an enlarged front elevational view of a portion of the apparatus, FIG. 5 is a side elevational view of a portion of the apparatus taken on the line V—V of FIG. 4, FIG. 6 is a longitudinal horizontal sectional view of an optical fiber forming part of the apparatus, and FIG. 7 is a transverse sectional view of the fiber taken on the line VII—VII of FIG. 6.

DESCRIPTION OF THE PREFERRED EMBODIMENT

Referring first to FIG. 1, wherein are best shown the general features of the invention, the optical apparatus, indicated generally by the reference numeral 10, is shown as consisting of an elongated housing 11, one end of which is attached to an image generator 12, such as a television tube. The image appearing on the tube is relatively small (as shown in FIG. 2) and is enlarged to a larger size as shown in FIG. 1. The transmission from the small image at end to the large image at the other end takes place through a bundle of optical fibers. In the preferred embodiment, the scanning lines would be around 500 in each direction, giving a total of around 250,000 fibers. As is evident in FIG. 3, the bundle of optical fibers is made up of a large number of layers, each layer being in the form of a ribbon in which the fibers are locked together with a cement, such as an epoxy.

Referring next to FIGS. 4 and 5, a first row 13 of optical fibers 14 is mounted in the housing 11. A second row 15 of fibers 14 similar to the first row is also mounted in the housing. The two rows 13 and 15 are cemented together at the first ends adjacent the generator 12 in close, fixed proximity. The other ends of the rows 13 and 15 are held in spaced, parallel relationship by wedges or spacers 17. The ends of the fibers at the said other ends of the rows are cut at a narrow angle to their centers to form broad emission surfaces 18, whose centroids are indicated by the reference numeral 19. It can be seen that the fibers in each row 13 and 15 are illustrative of other rows in the apparatus and all these rows are arranged with their centers in a flat plane. The spacers 17 which are located between the rows act to bring about spacing of the centers of the face surfaces 18 at the said other end to be the same between adjacent rows as they are between adjacent fibers in the same row.

FIGS. 6 and 7 show a single fiber at the output end of the apparatus. The surface 19 that is formed by the cut at the other end of each fiber is provided with a rough texture and the outer surface of the fiber 14 in the vicinity of the cut is coated with reflective material 21. As is obvious in FIGS. 6 and 7, the optical fiber 14 has a uniform cross-section which, in the preferred embodiment, is square and is adapted to receive a light image at the input end from the generator 12. A cladding layer 22 lies over the outer surface of the core 23 of the fiber, while the reflective layer 21 is carried over the cladding layer. The cutting of the entire body and fibers produces a cut of a narrow angle to the centroid at the exit end of the fiber to expose the surface 19 with an area much greater than the cross section and, of course, the surface is roughened. The surface exposed is rectangular where the fiber has a square cross section.

Each fiber 14 consists of a core 23 of relatively high index of refraction. The cladding layer 22 has a relatively low index of refraction and the outer reflective layer 21 in the preferred embodiment consists of aluminum applied by the vacuum vapor deposition process. The fibers in a given row 13 are molded in a solid ribbon of polymer in closely adjacent relationship, as is obvious in FIG. 5. Ribbons are held together in contacting layers from the input end through most of its length and the spacers 17 are placed between adjacent ribbons to hold the centers of the fibers at the same spacing in the vertical direction as in the lateral direction. For instance, in FIG. 4, the centers 19 of the surfaces 18 are spaced at a distance "D" in the vertical direction and are spaced the distance "D" in side-by-side relationship within the rows.

A method of forming the optical apparatus 10 consists of the steps of forming rows 13 and 15 of the optical fibers 14 in which the centers 19 of the fibers are evenly spaced and lie in a flat plane. One then cuts the row at the acute angle indicated in FIG. 3, thereby exposing the broad surfaces 18 that are substantially greater in size than the cross-section of the fibers. The surfaces 18 are then roughened by grinding or sand-blasting. Each fiber 14 is provided with a cladding layer 22 and a reflective layer 21 in the vicinity of the surfaces 18.

The operation and advantages of the invention will now be readily understood in view of the above discussion. When the visual image generator 18 is actuated, a small image shown in FIG. 2 is located adjacent the small end of the fibers. The light travels through the fibers and emerges at the other end on the surfaces 18. Of the reflective layer 21 and the roughened nature of the surface 18, the light emerges over the entire surface in a diffused manner, thus glowing over the entire surface. Naturally, the intensity of the illumination is reduced in inverse proportion to the relative size of the surface 18 as compared to the size of the cross-section of the fiber at the input end adjacent the generator 12 where the light is admitted.

In a practical version of the invention, the fiber 14 was selected with a circular cross-section and formed of glass with an index of refraction of 1.62. While the fiber was 0.004 inches in diameter, the core itself had a diameter of 0.0038 inches. A cladding layer 22 of glass with an index of refraction of 1.48 was applied to the layer in a thickness of 0.0001 with a total dimension added to the core of 0.0002 inches. The glass in the cladding was a borosilicate glass, while the core was a lead glass. The reflective layer 21 was aluminized, that is to say, aluminum applied by the vapor system of deposition. The face angle was 11°, thus giving a five-to-one amplification or image expansion. The spacing dimension D was 0.016 inches. This would be the size of the spacer 17 and would bring the center to center dimension D to 0.020 inches. In the case of this form of the invention, the fiber was round, thus giving a face surface 18 an oval shape.

It can be seen that the chief advantage of the present method of expanding a visual image is that the apparatus can be formed by the use of ordinary production methods. When desired, the manufacture of the individual ribbons with their layering and expanding by use of spacers 17 can take place on automatic machinery or with unskilled labor. Input to the device can be anyone of a number of visual image generating devices, such as a plasma display, a liquid crystal, a light emitting diode, a cathode-ray tube, or a vacuum fluorescent tube.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An optical apparatus for receiving an optical image at a first end and for producing an expanded form of the optical image at a second end, comprising:
   a plurality of optical fibers of uniform cross-section extending from said first end to said second end, each fiber having a core and cladding and an axis in the neighborhood of the second end, each fiber adapted to transmit light from the first end to the second end,
   the fibers formed into a plurality of rows, the fibers in a given row being held in a uniformly adjacent configuration,
   the several rows being held in close proximity at the first end and separated by spacers at the second end,
   all the rows of the fibers together being cut at the second end at a narrow angle to their axes to provide a broad emission surface at the end of each fiber, the surfaces being coplanar with each other to form an expanded image plane, each surface having a center, the widths of the spacers being such as to make the center-to-center distance between the adjacent rows at the second end the same as the distance between the centers of the faces of the adjacent fibers on the same row, so that the image at the second end is an undistorted form of the image at the first end, the surfaces at the second end having a roughened, diffusing texture to disperse light from the second end and providing a non-directional field of view for the expanded image.

* * * * *